United States Patent [19]

Ito et al.

[11] Patent Number: 4,537,420
[45] Date of Patent: Aug. 27, 1985

[54] SWING-ARM-TYPE SUSPENSION WITH A LATERAL ROD FOR AN AUTOMOTIVE VEHICLE

[75] Inventors: Hideo Ito, Zushi; Junsuke Kuroki; Namio Irie, both of Yokohama, all of Japan

[73] Assignee: Nissan Motor Company, Limited, Yokohama, Japan

[21] Appl. No.: 400,941

[22] Filed: Jul. 22, 1982

[30] Foreign Application Priority Data

Jul. 28, 1981 [JP] Japan .......................... 56-111002[U]
Feb. 19, 1982 [JP] Japan .......................... 57-25500[U]

[51] Int. Cl.³ ............................................ B62D 17/00
[52] U.S. Cl. .................................. 280/661; 280/690; 280/696; 280/700
[58] Field of Search ............... 280/690, 701, 700, 696, 280/661

[56] References Cited

U.S. PATENT DOCUMENTS

| | | | |
|---|---|---|---|
| 3,201,142 | 8/1965 | Dangauthier | 280/696 |
| 3,526,413 | 9/1970 | Muller | 280/96.2 |
| 3,917,308 | 11/1975 | Schulz | 280/700 |
| 4,087,103 | 5/1968 | Smith | 280/701 |
| 4,245,853 | 1/1981 | Inoue et al. | 280/701 |
| 4,466,635 | 8/1984 | Okada et al. | 280/661 |

FOREIGN PATENT DOCUMENTS

| | | |
|---|---|---|
| 2818198 | 10/1979 | Fed. Rep. of Germany . |
| 1554338 | 12/1968 | France . |
| 2473662 | 7/1981 | France . |
| 1393187 | 5/1975 | United Kingdom . |
| 2036241 | 6/1980 | United Kingdom . |
| 2071265 | 9/1981 | United Kingdom . |

Primary Examiner—Richard A. Bertsch
Attorney, Agent, or Firm—Lane, Aitken & Kananen

[57] ABSTRACT

A swing arm suspension for automotive vehicle has a suspension arm pivotably connected to a suspension member for rotation about a substantially horizontal pivot axis. A lateral rod is connected to the suspension arm at one end thereof via a bushing and to a suspension member at the other end via another bushing. The position where the lateral rod is connected to the suspension member and to the vehicle body are offset from the pivot axis of the suspension arm. The position is chosen such that the lateral rod serves to provide roll compensating force for the suspension to satisfactorily and successfully restrict roll or compliance steering effects in the toe-out direction and to prevent positive camber. The lateral rod is adapted to be connected to the suspension member at such a position as to cause toe-in and/or negative camber.

12 Claims, 28 Drawing Figures

SWING-ARM-TYPE SUSPENSION WITH A LATERAL ROD FOR AN AUTOMOTIVE VEHICLE

BACKGROUND OF THE INVENTION

The present invention relates generally to a swing-arm type of automotive suspension, such as a trailing-arm or semi-trailing arm-type suspension. More particularly, the invention relates to an automotive vehicle rear suspension of the swing-arm type that has a laterally extending assist link which improves suspension geometry by providing improved wheel alignment in response to outside forces.

In swing-arm-type automotive suspensions, wheel alignment is susceptible to positive camber and toe-out during compliance steering effects. These changes in wheel alignment will result in oversteer which degrades the cornering stability and drivability of the vehicle. Such wheel alignment changes occur due to deformation of suspension geometry and/or bushings in the suspension structure. Changes in suspension geometry mainly influence roll steering effects and deformation of the suspension bushings will affect compliance steering effects and camber change.

As is well known, in order to obtain better drivability and to optimize compensating cornering force in the suspension, it is necessary to restrict toe-out and positive camber from roll or compliance steering effects which would cause oversteering otherwise. For better drivability, the suspension should provide slight understeering. To obtain understeering characteristics, compliance steering effects or roll steering effects must cause some toe-in and negative camber.

Restriction of caster and camber change from compliance and roll steering effects has previously been achieved by providing sufficiently rigid bushings between the vehicle's suspension arms and suspension members. However, with rigid bushings, pitching force such as the winding-up moment and nose-dive moment applied to the vehicle during abrupt acceleration and deceleration of the vehicle cannot be satisfactorily absorbed by the suspension. This will degrade the riding comfort of the vehicle.

The prior art has not provided enough rolling and cornering compensation force and satisfactory pitch absorbing effect with a swing-arm type of automotive rear suspension.

The present invention improves the suspension geometry in the swing-arm type of suspension in order to restrict compliance steering, roll steering effects and camber changes occurring in response to outside forces and maintains the desirable pitch absorbing effect provided by bushings in conventional suspension systems. In order to achieve this, the swing arm suspension according to the present invention is provided with a rod extending generally laterally toward the vehicle's longitudinal axis. The lateral rod provides lateral support and reduces compliance or roll steering toe-out and positive camber changes.

SUMMARY OF THE INVENTION

Therefore, it is an object of the present invention to provide an automotive rear suspension structure of swing arm type, in which suspension geometry provides improved rolling and cornering force and pitch stabilization.

In order to accomplish the above-mentioned and other objects, there is provided a swing arm suspension for automotive rear suspension, according to the present invention, which has a suspension arm having a front part pivotably attached to a suspension member for rotation about a substantially horizontal pivot axis and a rear part rotatably supporting one of the vehicle's wheels. One end of a lateral rod is connected to the suspension arm via a bushing and the other end is connected to the vehicle body via a bushing. The position where the lateral rod is connected to the vehicle body is offset from the pivot axis of the suspension arm. The position is chosen such that the lateral rod augments the rolling and cornering compensation force of the suspension to satisfactorily and successfully restrict roll or compliance steering effects in the toe-out direction and to restrict positive camber change. Preferably, the connecting end of the lateral rod should be connected to the vehicle body at a position producing toe-in and/or negative camber.

According to the present invention, in conjunction with the lateral rod, the suspension arm bushings interposed between the suspension arm and the suspension member are sufficiently flexible to satisfactorily absorb pitching force applied to the road wheel.

BRIEF DESCRIPTION OF THE DRAWINGS

The present invention will be understood more fully from the detailed description given herebelow and from the accompanying drawings of the preferred embodiments of the present invention, which, however, should not be taken as limitative to the invention but for elucidation and explanation only.

In the drawings.

DESCRIPTION OF THE PREFERRED EMBODIMENTS

Figure 1:
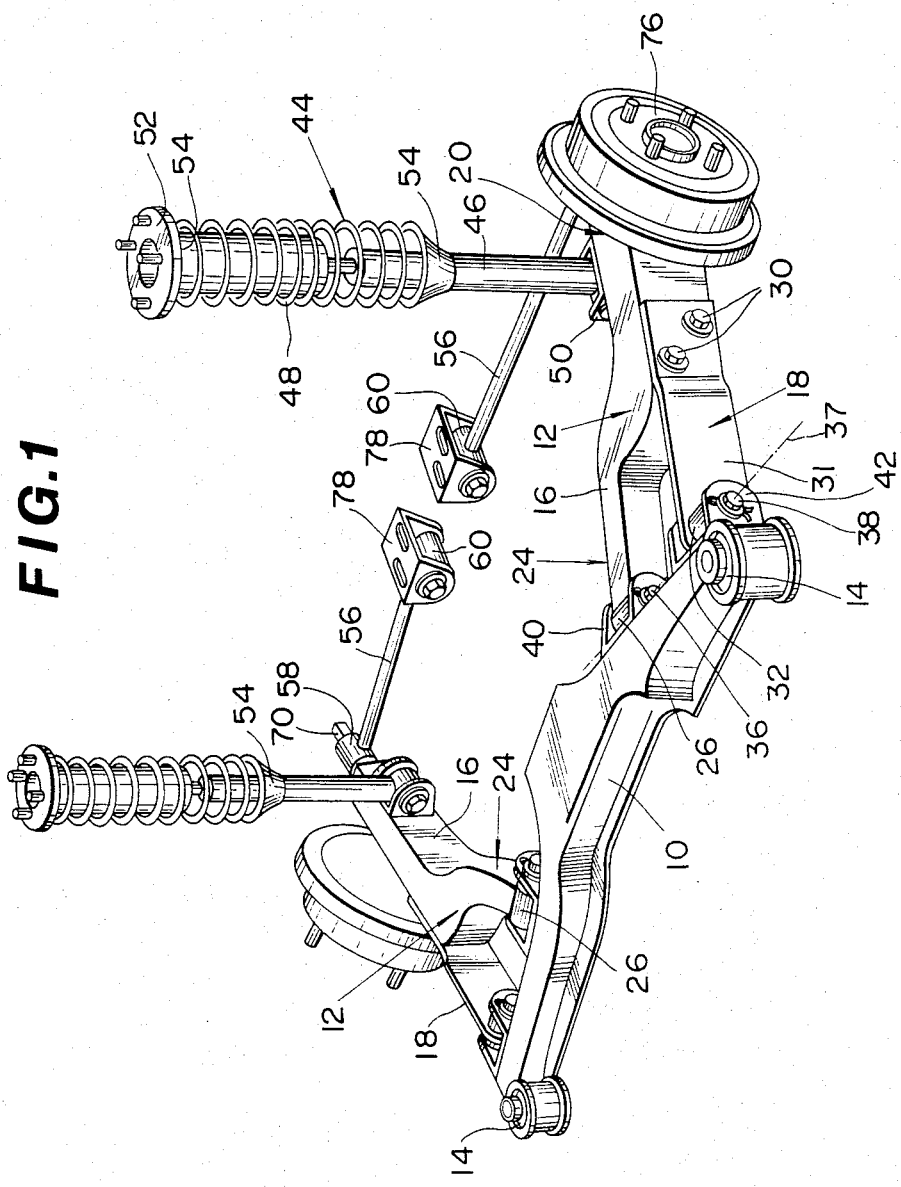
FIG. 1 is a perspective view of the first embodiment of a semi-trailing arm suspension according to the present invention.
Figure 2:
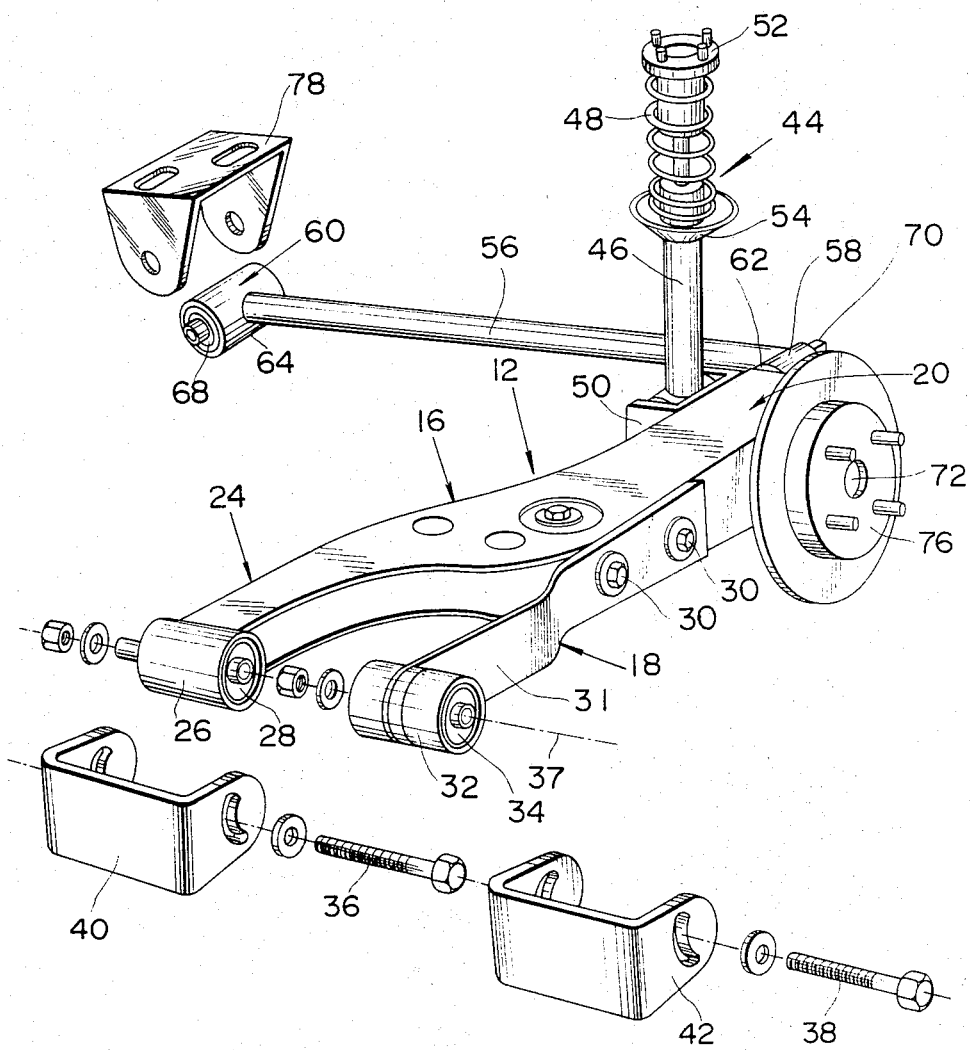
FIG. 2 is an enlarged perspective view of the suspension arm in the first embodiment of the semi-trailing arm of FIG. 1.

Referring now to the drawings, particularly to FIGS. 1 to 4, there is illustrated the preferred embodiment of a semi-trailing arm suspension for an automotive vehicle according to the present invention. As will be appreciated from FIG. 1, the semi-trailing arm suspension is employed in a front-wheel-drive vehicle. However, the invention is not intended to be limited to the semi-trailing-arm type of suspension but may include trailing arm or other swing arm suspensions, nor is the suspension in the present invention limited to a front-wheel-drive vehicle but is also applicable to a rear-wheel-drive vehicle.

The semi-trailing arm suspension generally comprises a suspension member 10 and a suspension arm 12 pivotably attached to the suspension member 10. The suspension member generally comprises part of a vehicle chassis and is connected at both ends to a vehicle body side frame (not shown). Bushings 14 are inserted between the suspension member 10 and the vehicle body side frame to isolate vibrations transmitted therebetween.

The suspension arm 12 comprises a suspension arm body 16 and a resilient member 18. The suspension arm body 16 has a rear, wheel mounting portion 20 from which a spindle 72 extends laterally, and a front, pivot portion 24 located at the front end thereof and provided with a hollow cylindrical end 26 which houses a bushing assembly 28. The pivot portion 24 doglegs inwardly from the wheel mounting portion 20 and the pivot portion 24 comprises an inner leg of the suspension arm body. The resilient member 18 is fixed to the outer vertical wall all of the suspension arm body with fastening bolts 30 and has an offset pivot portion 31 forward of the bolts 30. At the front end of the resilient member, there is provided a hollow cylindrical portion 32 for housing a bushing assembly 34. The longitudinal axis of the cylindrical portion 32 is aligned with that of the cylindrical end 26 of the suspension arm body 16. The pivot portions 24 and 31 are also inclined upwardly towards the front ends thereof.

The cylindrical end 26 and the cylindrical portion 32 are free to pivot about pivot bolts 36 and 38 respectively passing through the bushing assemblies 28 and 34 which engage inner and outer brackets 40 and 42 fixed to the rear vertical surface of the suspension member 10. Therefore, the axes of the pivot bolts 36 and 38 are in alignment to form a common pivot axis 37 of substantially vertical swing of the suspension arm 12 with respect to the suspension member 10.

On the other hand, the suspension arm 12 is suspended from the vehicle body (not shown) via a shock absorber assembly 44 including a shock absorber 46 and a suspension coil spring 48. The lower end of the shock absorber 46 is connected to the suspension arm 12 via a bracket 50 and the top thereof is connected to the vehicle body via a vibration-damping flange. The suspension coil spring 48 winds around the upper portion of the shock absorber between upper and lower spring seats 54. In this construction, the shock absorber assembly 44 is adapted to absorb most of the vertical road shock and resiliently suspend the suspension arm 12 from the vehicle body.

Figure 3:
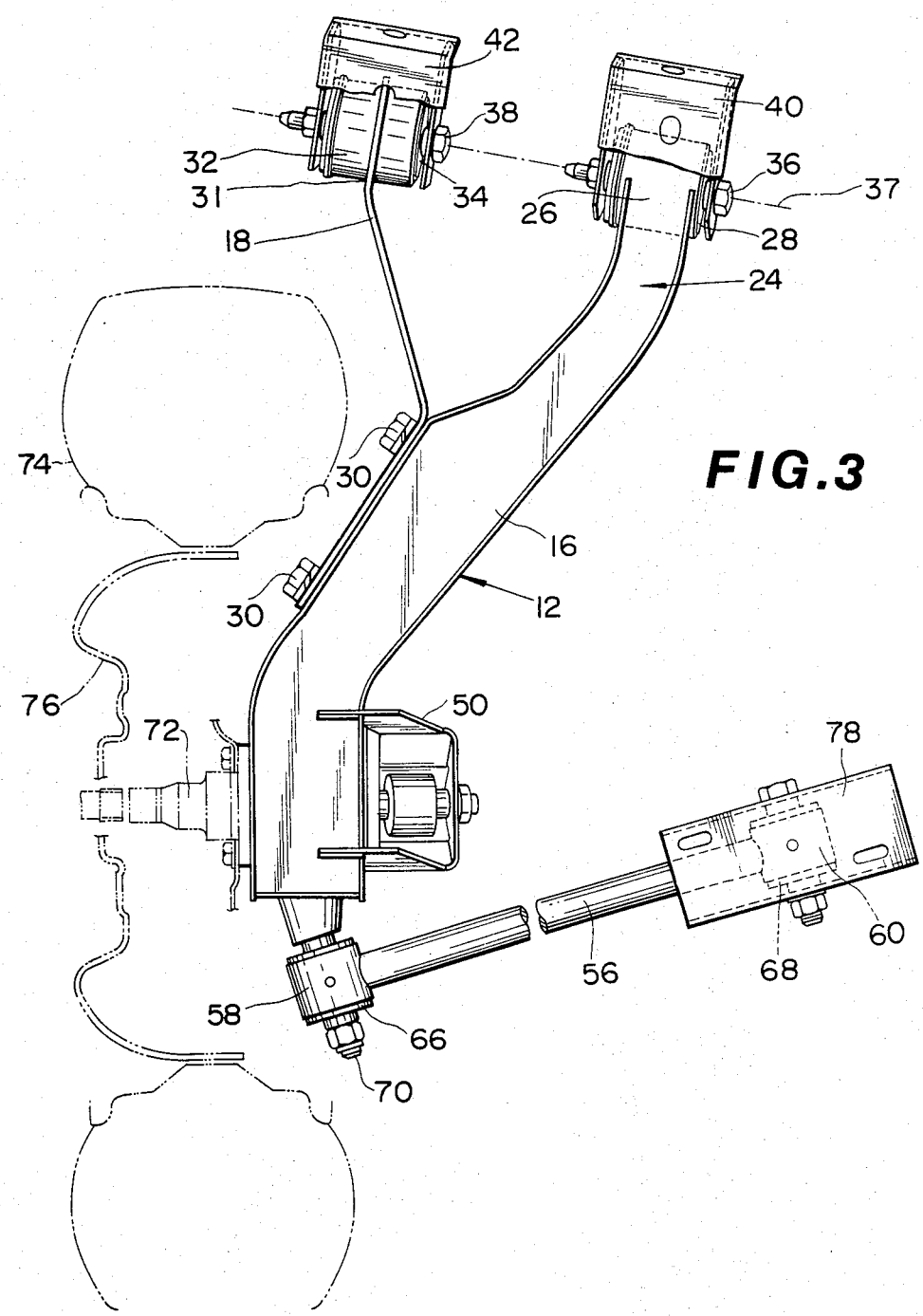
FIG. 3 is a plan view of the semi-trailing arm suspension of FIG. 1.
Figure 4:
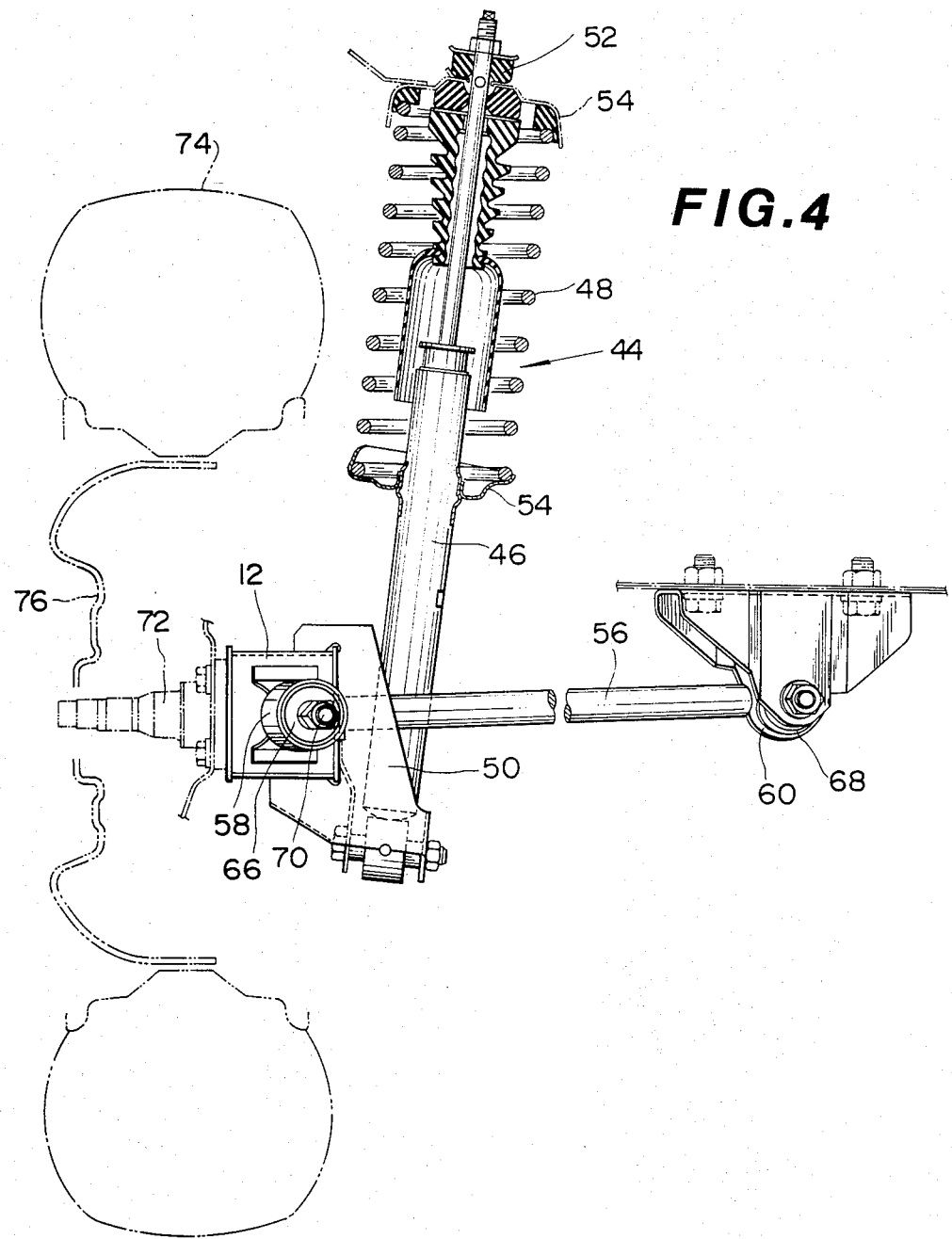
FIG. 4 is a rear elevation view of the semi-trailing arm suspension of FIG. 1.

A lateral rod 56 has outer and inner ends 58 and 60 respectively provided with hollow cylindrical portions 62 and 64 for housing bushing assemblies 66 and 68. The outer end 58 with the bushing assembly 62 engages a pivot axle 70 extending from the rear end of the suspension arm 12 near the spindle 72 on which a road wheel 74 and a wheel hub 76 are mounted. The inner end 60 of the lateral rod 56 is connected to an appropriate point of the vehicle body via bushing assembly 68 in a bracket 78. As shown in FIGS. 3 and 4, the lateral rod 56 is inclined frontwardly and upwardly towards the bracket 78. The angle inclination of of the lateral rod 56 is chosen to affect wheel alignment as described hereafter with reference to FIGS. 5 and 6. The present invention is intended to adjust wheel alignment particularly in response to a lateral force applied thereto in the toe-in direction and in the negative camber direction by compliance steering or roll steering effects. In order to achieve this, it is essential to offset the inner end of the lateral rod 56 from the pivot axis 37. Furthermore, it is necessary to elevate the inner end 60 of the lateral rod 56 relative to the outer end 58. Offsetting the inner end 60 of the lateral rod 56 from the pivot axis 37 is intended to provide different motion centers for the suspension arm 12 and the lateral rod to effectively cause mutal interference between the independent movements of the suspension arm 12 and the lateral rod 56 to geometrically cause the desired wheel alignment changes. This interaction will be described in detail hereinafter with reference to FIGS. 5 and 6 and 16.

Figure 5:
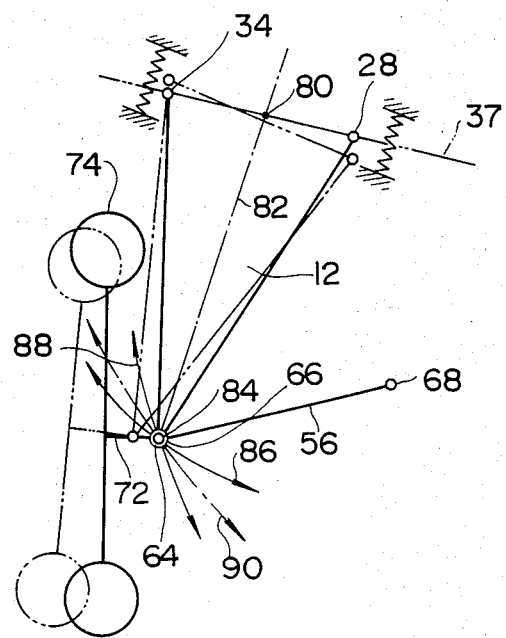
FIG. 5 is an explanatory illustration showing a suspension geometry on a horizontal plane and change thereof of the semi-trailing arm suspension of FIG. 1.
Figure 6:
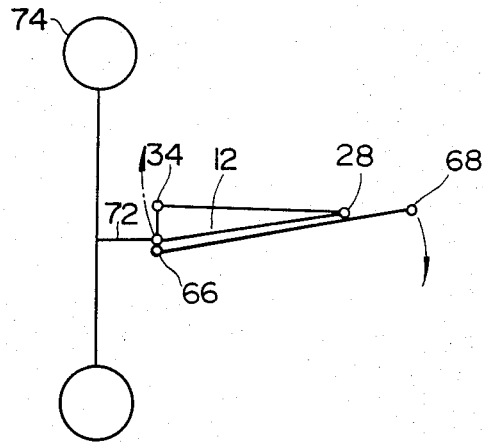
FIG. 6 is an explanatory illustration of a suspension geometry of the semi-trailing arm suspension of FIG. 1 on a vertical plane, and showing movement of the suspension elements in response to a lateral force applied thereto.

FIGS. 5 and 6 are geometrical illustrations of the semi-trailing arm suspension of FIGS. 1 to 4. In order to simplify the drawing of motions and reactions during compliance steering, roll steering and camber change, structural elements of the semi-trailing arm suspension of the present embodiment have been represented only by axes and points thereof. As shown in FIG. 5, by the horizontal view the suspension arm 12 is suspended from the suspension member 10 via resilient bushings 28 and 34. The bushings 28 and 34 permit pivotal movement of the suspension arm 12 with respect to the suspension member 10. On the other hand, the lateral rod 56 is connected to the suspension arm 12 via the bushing 66 which permits the lateral rod to pivot relative to the suspension arm 12. In turn, the lateral rod 56 is connected to the vehicle body via the bushing 68. Here, in order to simplify the following explanation, the flexibility of the bushing 68 is ignored. In fact, the bushing 68 is flexible only in order to permit the lateral rod to move relative to the vehicle body in response to forces applied to the road wheel 74 which are, in turn, transmitted to the bushing 68 via the suspension arm 12 and the lateral rod 56. The deformation of the bushing 68 need not be considered in order to understand the geometrical function of the shown embodiment.

Assuming a lateral force Fy relative to the vehicle body road is applied to the wheel 74, as it is during cornering, a slight rotational motion occurs in the suspension arm 12 due to deformation of the bushings 28 and 34. As shown in FIG. 5, the motion center 80 of the suspension arm 12 is positioned between the bushings 28 and 34 along the pivot axis 37. Therefore, with the rotational axis 82 extending through the motion center 80, the suspension arm 12 responds to the angular moment to rotate slightly counterclockwise in FIG. 5. On the other hand, the lateral rod 56 rotates slightly about the bushing 66 in response to the lateral force applied through the suspension arm 12. By this, assuming the absence of the lateral rod 56, the point 84 from which the spindle 72 projects would move along a curve 86 according to the rotation of the suspension arm 12. On the other hand, in the absence of suspension arm 12, the bushing 64 would move along the curve 88 closer to horizontal. The sum of the movements of the suspension arm 12 and the lateral rod 56 cause the point 84 to move along the resultant curve 90. Due to the complex interaction of the movements of the suspension arm 12 and the lateral rod 56, the inward movement of the point 84 is reduced relative to either of the above assumed cases. As can be appreciated from the resultant position of the wheel indicated in phantom in FIG. 5, toe-out angle during compliance or roll steering is decreased.

On the other hand, this horizontal view does not provide a complete picture of these changes as shown by the vertical view in FIG. 6, the point 84 from which the spindle 72 projects is located at a level level below the of the bushings 28 and 34 and the bushing 66 is even lower than the point 84. However, the vertical displacement between the point 84 and the bushing 66 is quite small and therefore can be ignored for consideration of the suspension geometry. It should also be borne in mind that the bushing 68 is positioned higher than the bushing 66 as set forth previously. Therefore, as can be understood, the length of the lateral rod in FIG. 5 is only the horizontal projection thereof and its real length is greater than the apparent length.

In addition to the lateral force Fy, centrifugal force is also applied to the vehicle as it moves through a turn. This centrifugal force causes downward displacement of the outside of the vehicle body relative to the wheels. Therefore, the lateral rod 56 rotates upwardly about the bushing 68 to approach horizontal orientation. In this way, the point 84 is shifted outside in FIG. 5 to further reduce the toe-out angle or to cause toe-in during compliance steering or roll steering. This extension of the horizontal projection of the lateral rod 56 also causes negative camber rather than positive camber, which increases cornering force. The camber angle is generally determined according to the inclination of the pivot axis which determines the rotational radius of the point 84 in the vertical direction. Therefore, as will be appreciated, by definition camber angle will vary depending upon the angle of inclination of which is determined by the axis of the spindle 72 with respect to the road surface the orientation of the lateral rod 56. Thus, by carefully selecting the length of the lateral rod 56, negative camber can be produced in order to increase cornering force.

Figure 7:
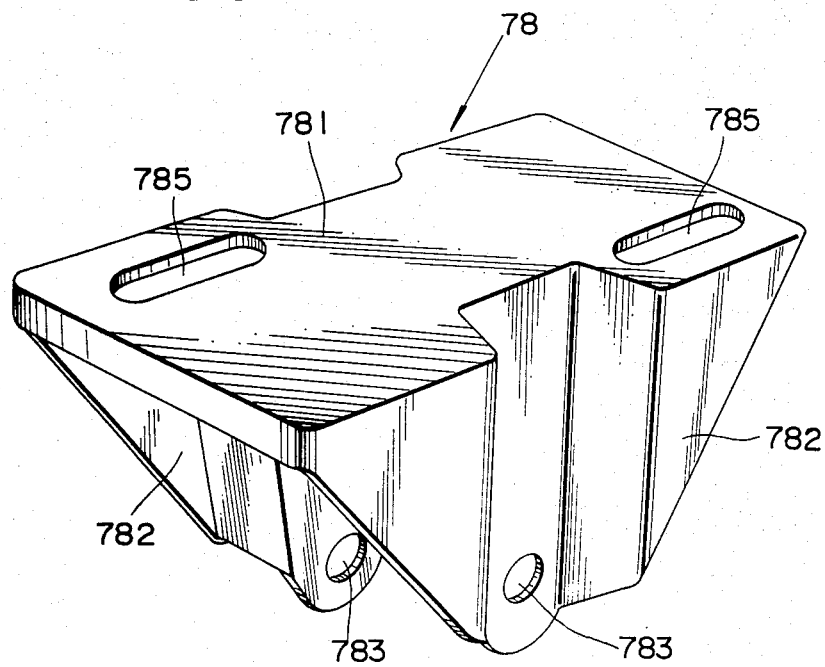
FIG. 7 is an enlarged perspective view of a bracket applicable to the semi-trailing arm suspension of FIG. 1.
Figure 8:
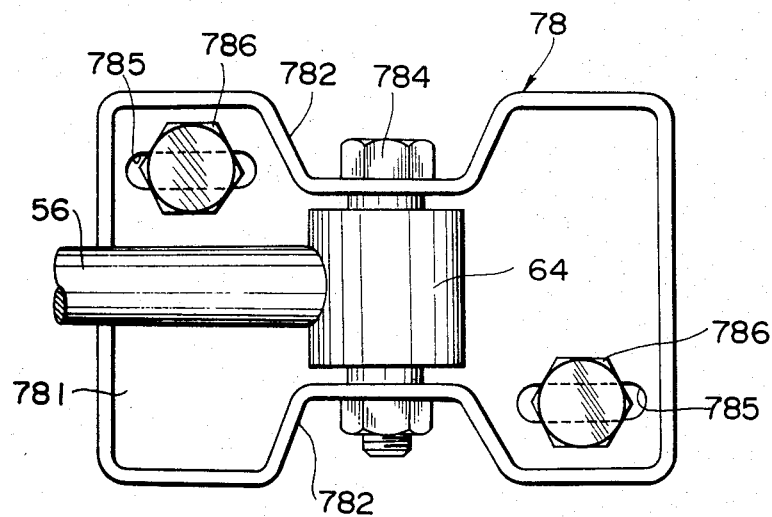
FIG. 8 is a bottom view of the bracket of FIG. 7.
Figure 9:
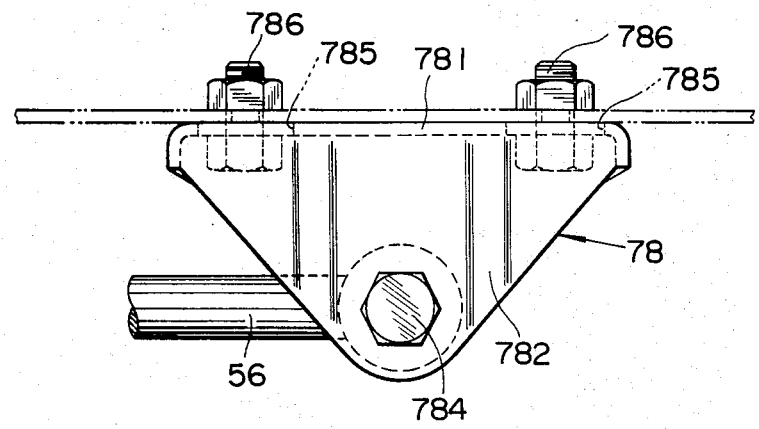
FIG. 9 is a side elevation view of the bracket of FIG. 7.

To facilitate an appropriate wheel alignment, it would be easier to adjust the position of the bracket 78 suitably than to adjust the inclination of the suspension arm from the pivoted front end to the wheel mounting portion. FIGS. 7 to 8 show detail of a bracket 78 which permits variation of the location thereof with respect to the outer end of the lateral rod 56. As shown in FIGS. 7 and 8, the bracket 78 comprises a base section 781 to be mounted to the vehicle body and vertical sections 782 extending from both side edges of the base section 781. The vertical sections have through openings 783 to receive pivot bolts 784. On the other hand, the base section 781 is formed with a pair of elongated openings 785 through which fastening bolts 786 engage threaded openings (not shown) defined in the vehicle body. The elongated openings 785 are aligned parallel to the longitudinal axis of the lateral rod 56.

The bracket 78 is fitted to the vehicle body with the fastening bolts 786 passing through the elongated openings 785. The elongated openings 785 allow the bracket 78 to move back and forth with respect to the outer end of the lateral rod 56 to adjust the position of the bracket.

Figure 13:
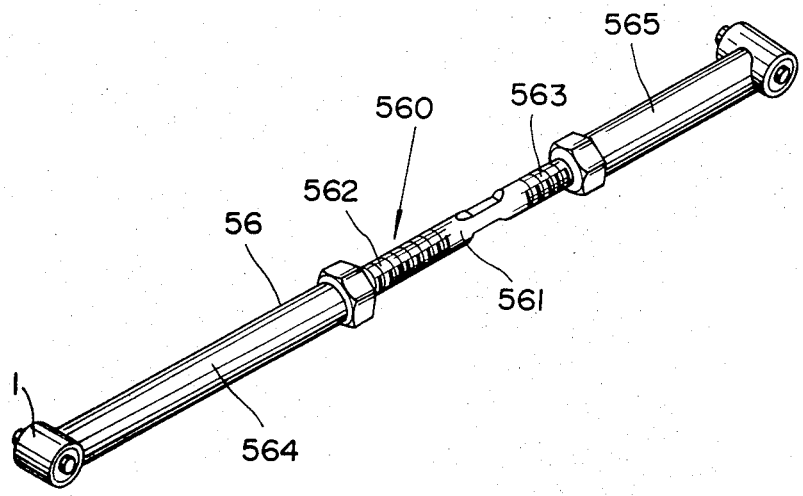
FIG. 13 is a perspective view of a lateral rod applied in the semi-trailing arm suspension of FIG. 1.
Figure 14:
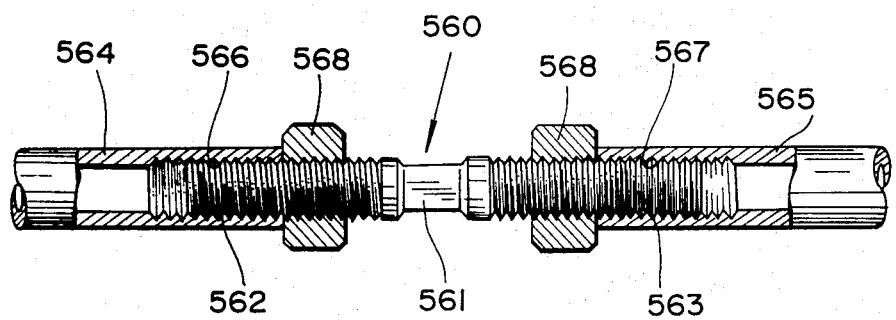
FIG. 14 is a longitudinal section view of the lateral rod of FIG. 13.

In the preferred embodiment, there is also provided adjusting means 560 for adjusting the length of the lateral rod 56. As shown in FIGS. 13 and 14, the adjusting means 560 comprises an adjusting screw 561 formed with threaded portions 562 and 563 at both ends thereof. As will be appreciated, the threaded portions 562 and 563 are threaded in opposite directions. The lateral rod 56 is separated into outer and inner sections 564 and 565 which both have threaded bores 566 and 567 which engage the respective threaded portions of the adjusting screw 561. Thus, the length of the lateral rod 56 can be adjusted by rotating the adjusting screw 561 in either the expansion or the contraction direction via the grip portion 568.

Figure 10:
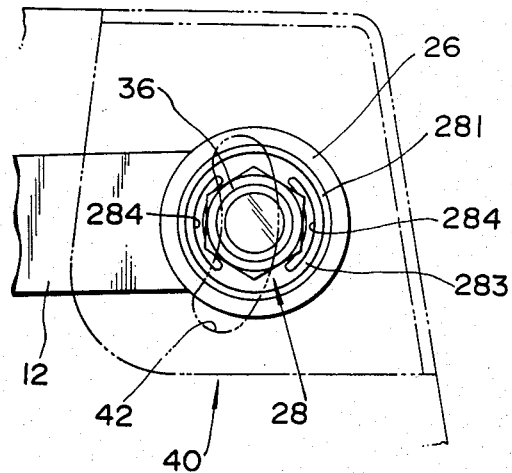
FIG. 10 is a side elevation view of a bracket in the semi-trailing suspension of FIG. 1 for mounting the suspension arm to a suspension member.

On the other hand, adjustment of the inclination angle of the suspension arm towards the wheel mounting portion can be made by elongated curve openings 401 and 421 formed in the inner and outer brackets 40 and 42. As shown in FIG. 10, the longitudinal axes of the elongated curved openings 401 and 421 are directed substantially vertically to permit the displacement of the bushing assemblies 28 and 34 of the suspension arm 12 with respect to the mounting surfaces of the inner and outer brackets 40 and 42. The bushing assemblies 28 and 34 are secured to the inner and outer brackets 40 and 42 with the pivot bolts 36 and 38. The bushings 28 and 34 are movable up and down along the elongated curved openings 401 and 421 to adjust the inclination of the suspension arm 12 with respect to the horizontal plane passing through the pivot axis.

Figure 11:
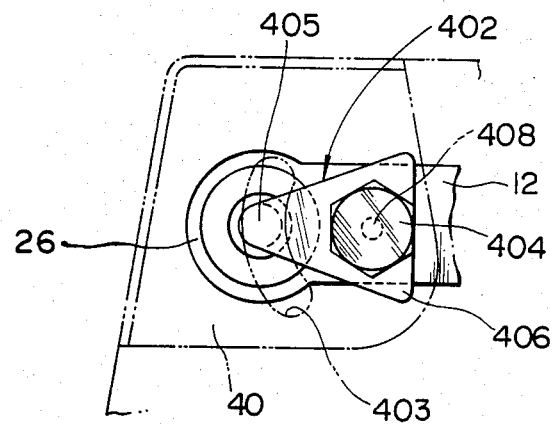
FIG. 11 is a view similar to FIG. 10 but showing a modification of the bracket of FIG. 10.
Figure 12:
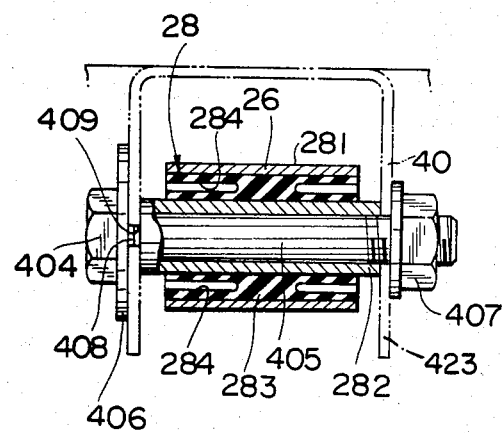
FIG. 12 is a cross-section of the bracket of FIG. 11 shown engaged with the front end of the suspension arm.

FIGS. 11 and 12 show a modification of the inclination adjusting means of FIG. 10. In the shown embodiment, a specially constructed pivot bolt 402 is used to adjust the inclination of the suspension arm 12 with respect to the horizontal plane. As in the foregoing embodiment, the brackets 40 and 42 are formed with elongated curved openings 403 and 423. The pivot bolt 402 includes a head portion 404 offset from the axis of the threaded bolt section 405. A substantially triangular plate 406 connects the head portion 404 and the bolt section 405. The bolt section 405 is engageable with a fastening nut 407. On the other hand, the triangular plate 406 is provided a pin 408 projecting from the surface of the head portion 404 facing the the brackets 40 and 42. The pin 408 is engaged with a recess 409 formed in the bracket 40 or 42 to constitute a pivot for movement of the triangular plate 406 with the bolt section 405 along the elongated curved openings 403 or 423. This way, as in the foregoing embodiment, the inclination of the suspension arm 12 with respect to the horizontal plane can be adjusted by turning the head portion 404.

As shown in FIGS. 10 and 12, each of the bushing assemblies 28 and 34 comprises an outer metal cylinder 281, an inner metal cylinder 282 and an annular rubber bushing 283 interpositioned between the inner and outer metal cylinders 281 and 282. As is well known, the inner cylinder 282 extends from both ends of the outer cylinder 281 and the bushing 283 to define a clearance between the end of the bushing 283 and the wall of the bracket 40 or 42. The bushing 283 is formed with grooves 284 extending along the longitudinal axis thereof. The grooves 284 are diametrically opposed along the longitudinal axis of the legs of the suspension arm 12. These grooves 284 provide added flexibility for the bushing 283 with respect to pitching force applied thereto. Since the pitching force is generally applied along the longitudinal axis, the grooves 284 satisfactorily absorbs the pitching moment applied to the vehicle body from the wheel 74. As set forth previously, the rolling force or cornering force is maintained at least at the conventional level or increased in cooperation with the lateral rod.

Figure 15:
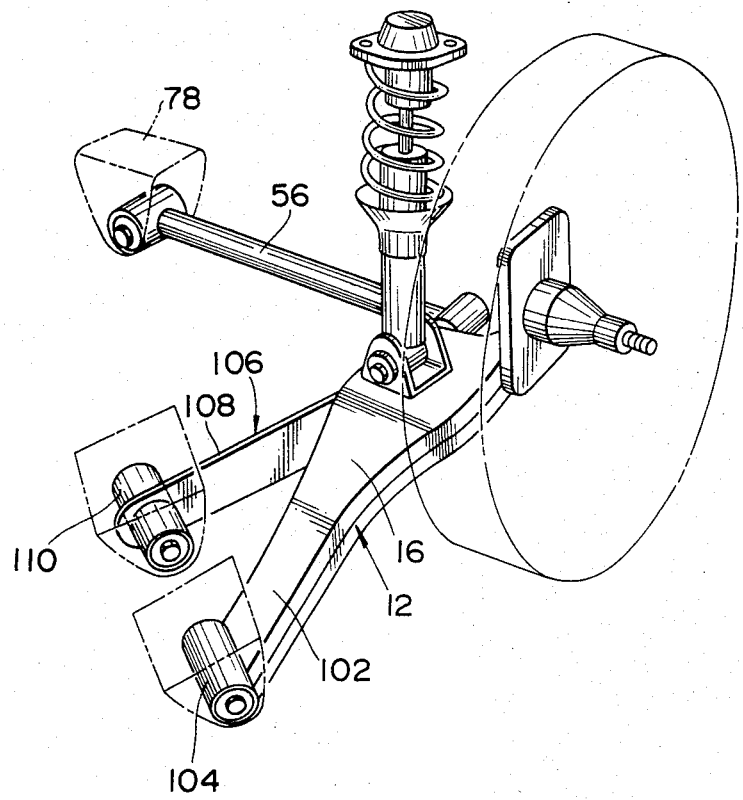
FIG. 15 is a perspective view of a modification of the semi-trailing arm suspension of FIG. 1.

FIG. 15 shows a modification of the suspension arm in the semi-trailing arm suspension of FIGS. 1 to 4. In the shown modification, the arm body 16 comprises an outer leg 102 with a cylindrical end 104. A resilient member 106 is in the form of an inner leg 108 with the cylindrical portion 110 is attached to the inner vertical surface of the arm body 16. The cylindrical portion 110 of the resilient member 106 houses the bushing assembly 112.

As in to the foregoing first embodiment of FIGS. 1 to 4, the lateral rod 56 extends laterally from the rear end of the suspension arm 12. The lateral rod 56 is also connected to the vehicle body through the bracket 78.

In the two foregoing embodiments, the resilient members 18 and 106 cause the suspension arm to be deformed in the direction of toe-in during compliance steering and roll steering and cause negative camber simultaneously. In this way, in response to lateral forces applied to the wheels, the resilient members 18 and 106 are deformed to cause toe-in and negative camber to increase cornering force.

Figure 16:
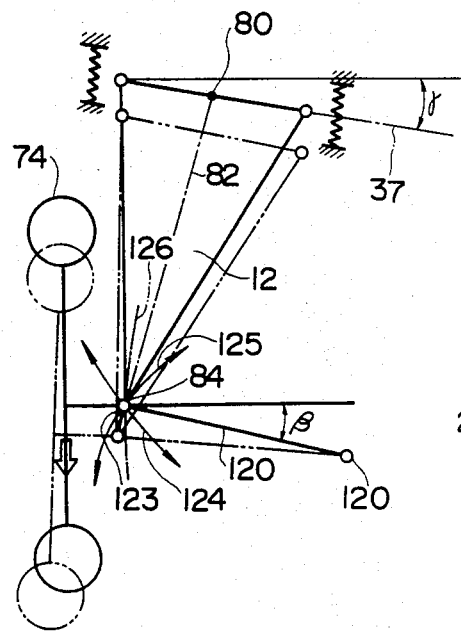
FIG. 16 is a geometric illustration showing the operational features of another modification of the first embodiment of the semi-trailing arm suspension of FIG. 1.

FIG. 16 shows another modification of the first embodiment, in which wheel alignment is modified to more satisfactorily cause toe-in and negative camber. In this embodiment, the lateral rod 120 is inclined such that the inner end 122 is rearward of the outer end 123 thereof. As shown in FIG. 16, the pivot axis 37 is inclined at an angle $\gamma$ with respect to the lateral axis normal to the longitudinal axis of the vehicle body. On the other hand, the lateral rod 120 is provided a rearward inclination of an angle $\beta$.

In this construction, assuming the absence of the lateral rod 120, the suspension arm 12 moves about a motion center 80 with motion axis 82 in response to lateral forces applied to the wheel 74. The path of displacement of the point 84 is as represented by line 124. However, the movement lateral rod 120 interacts with the movement of the point 84 along the curve 124. Ignoring the restraint provided by the suspension arm, the outer end 123 of the lateral rod 120 would move along the curve 125. This time, since the pivotal point of the lateral rod 120, i.e., the inner end 122, is rearward of the outer end 123, the back end of radius line 125 extends outward from point 84. Thus, the point 84 moves in response to the lateral force along a curve represented in phantom lines 126 shifted outwards of the curve 124. As a result, movement of the point 84 resulting in toe-out during compliance steering and roll steering is reduced. The interaction between the movements of the suspension arm 12 and the lateral rod 120 cause toe-in to provide slight understeering characteristics in this suspension geometry.

Figure 18:
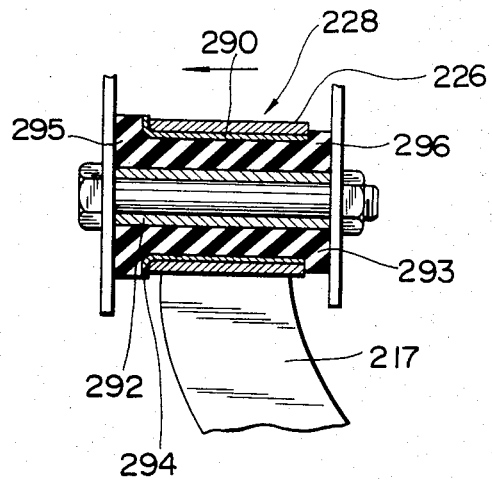
FIG. 18 is an enlarged cross section of a bushing assembly to be employed in the suspension of FIG. 18.
Figure 17:
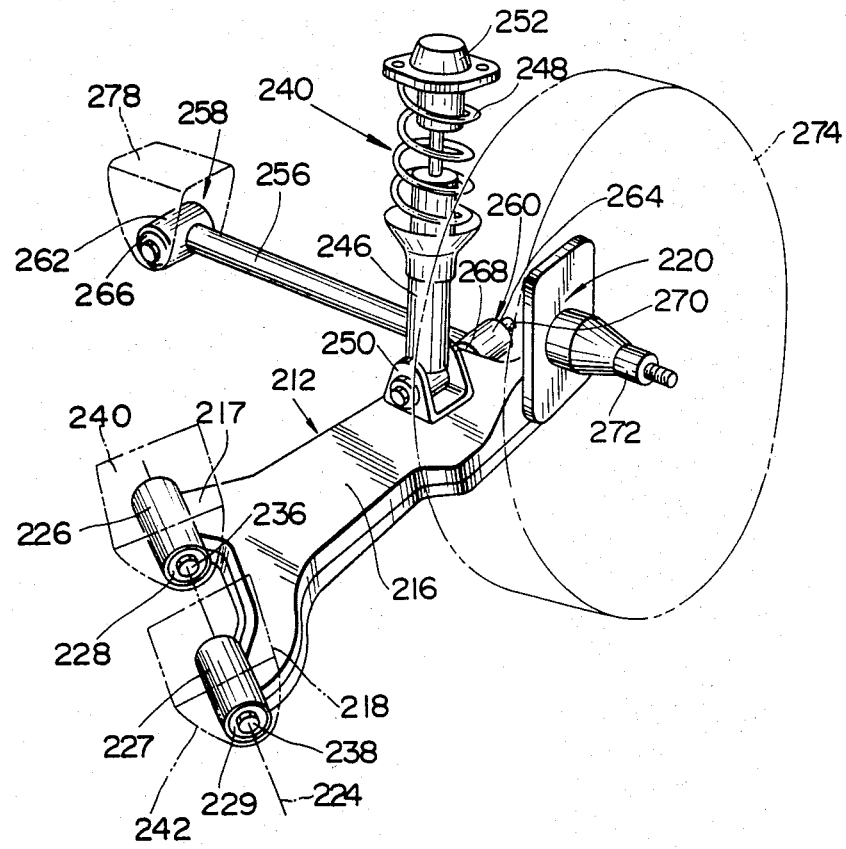
FIG. 17 is a perspective view of the second embodiment of the semi-trailing arm suspension according to the present invention.

Referring to FIGS. 17 and 18, the second embodiment of a semi-trailing arm suspension for an automotive vehicle according to the present invention is illustrated.

As in the foregoing first embodiment, the semi-trailing arm suspension generally comprises a suspension member (not shown) and a suspension arm 212 pivotably connected to the suspension member. The suspension arm 212 comprises a suspension arm body 216 and a pair of leg portions 217 and 218. The suspension arm body 216 has a wheel mounting portion 220 from which a spindle 272 extends laterally. The leg portions extend frontwards from the arm body 216 and are provided with inner and outer cylindrical ends 226 and 227 which house bushing assemblies 228 and 229 respectively. The pivot axis 224 passing through the cylindrical ends, 226 and 227, is inclined with respect to the lateral direction of the vehicle body.

The cylindrical ends 226 and 227 pivot about pivot bolts 236 and 238 respectively passing through the bushing assemblies 228 and 229 and fixed to inner and outer brackets 240 and 242 fixed to the rear vertical surface of the suspension member adjacent both ends thereof. Therefore, the axes of the pivot bolts 236 and 238 are in alignment to form a common pivot axis 224 for substantially vertical swing movement of the suspension arm 212 with respect to the suspension member.

On the other hand, the suspension arm 212 is suspended from a vehicle body (not shown) via a shock absorber assembly 244 including a shock absorber 246 and a suspension coil spring 248. The lower end of the shock absorber 246 is connected to the suspension arm 212 via a bracket 250. The top end of shock absorber 246 is connected to the vehicle body via a vibration damper 252. The suspension coil spring 248 winds around the upper portion of the shock absorber between upper and lower spring seats 254. In this construction, the shock absorber assembly 244 is adapted to absorb most of the vertical shock and to resiliently suspend the suspension arm 212 from the vehicle body.

A lateral rod 256 has outer and inner ends 258 and 260 respectively provided with cylindrical portions 262 and 264 to house bushing assemblies 266 and 268. The outer end 258 with the bushing assembly 262 is engages with a axle 270 extending from the rear end of the suspension arm 212 near the spindle 272, which rotatably supports a wheel 274 and a wheel hub. The inner end 260 of the lateral road 256 is connected to the vehicle body via a bracket 278. The lateral rod 256 is inclined frontwardly and upwardly towards the bracket 78. The inclination angle of the lateral rod 56 is chosen so as to cause the wheel alignment, particularly in response to lateral forces, to reduce toe-out or to cause toe-in.

As shown in FIG. 18, the bushing assemblies 228 and 229 respectively comprise an outer cylinder 290, an inner cylinder 292 and a rubber bushing 293. The outer cylinder 290 has a radially extending flange 294 at one end. The rubber bushing 293 extends axially from both ends of the outer cylinder 290 along the entire length of the inner cylinder 292 and has radially extending flange portions 295 and 296. The diameter of the flange portion 295 is larger than that of the flange portion 296. The axial length of the outer cylinder 290 corresponds to that of the cylindrical end 226 or 227 of the leg portions 217 or 218 of the suspension arm 12. The radially extending flange 294 of the outer cylinder 290 is adapted to contact the axial edge of the cylindrical end 226 or 227.

The bushing assemblies 228 and 229 are respectively arranged to position the flange portions 295 outwards of the other flange portions 296. In this way, the rigidity at the outer end of the bushing assemblies 228 and 229 exceeds that at the inner ends. This gives to the suspension arm a tendency to move in the direction of toe-in during compliance steering or roll steering in response to the lateral forces.

Figure 19:
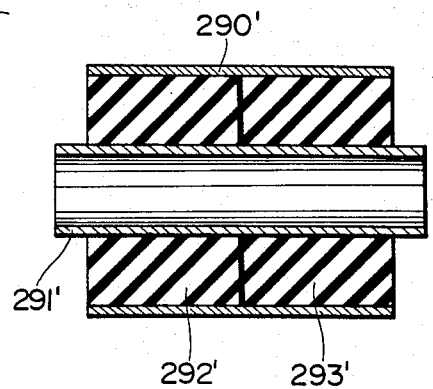
FIG. 19 is an enlarged cross-sectional view of the bushing assembly to be employed in the suspension of FIG. 18, which bushing assembly is a modification of that shown in FIG. 18.

FIG. 19 shows a modification of the bushing assembly of FIG. 18. In this modification, the bushing assembly comprises the outer cylinder 290', the inner cylinder 291' and outer and inner bushings 292' and 293'. The rubber bushings 292' and 293' are made of materials with different bulk elastic moduli. The rigidity of the outer bushing 292' is higher than that of the inner bushing 293'. This way, the same effect on compliances steering or roll steering characteristics can be enhanced.

Figure 20:
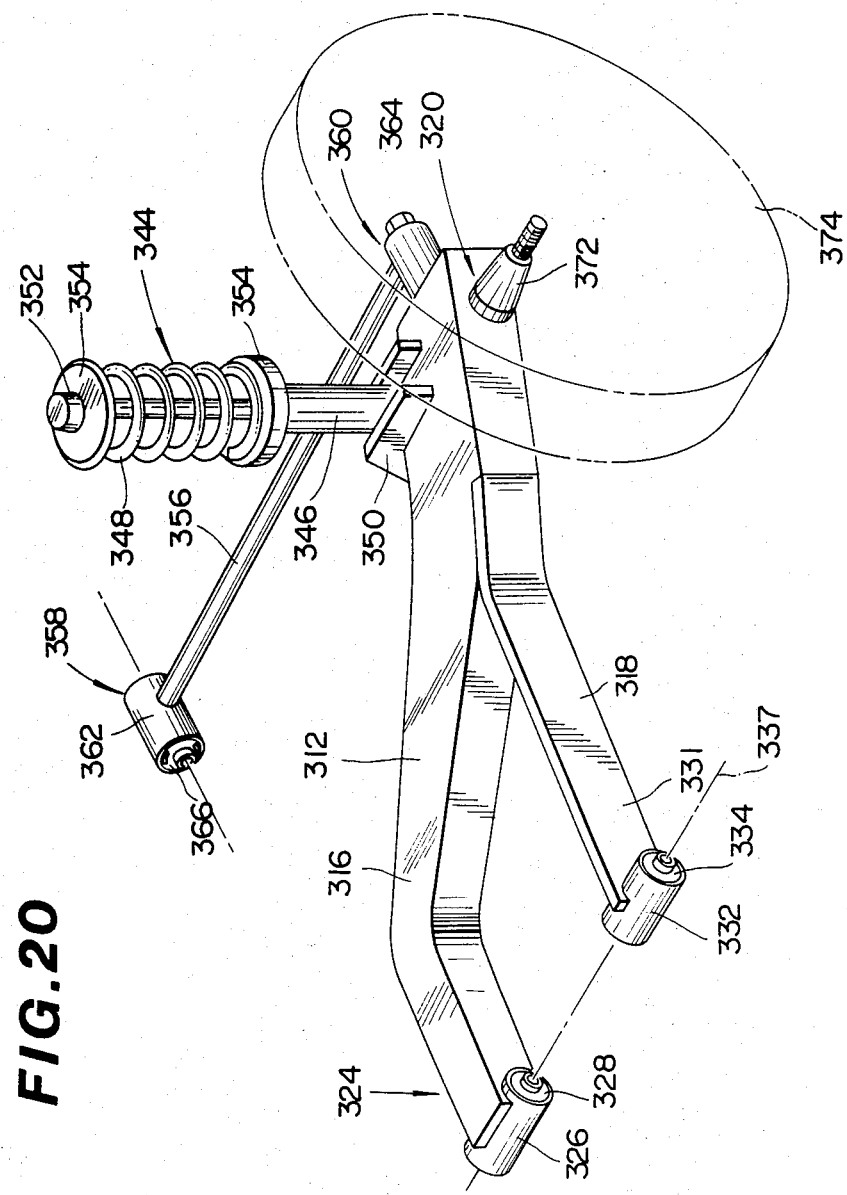
FIG. 20 is a perspective view of the third embodiment of the semi-trailing arm suspension of the invention.

FIGS. 20 to 23 show the third embodiment of the semi-trailing arm suspension of the present invention. In this embodiment, deformation of the bushings can be limited or restricted in order to extend the life of the bushings. As shown in FIG. 20, the semi-trailing arm suspension in this embodiment has a structure similar to that set forth with respect to FIG. 1.

As shown in FIG. 20, the semi-trailing arm suspension generally comprises a suspension member and a suspension arm 312 hinged to the suspension member. The suspension arm 312 comprises a suspension arm body 316 and a resilient member 318. The suspension arm body 316 has a wheel mounting portion 320 from which a spindle 372 extends laterally and a pivot portion 324 located at the front end thereof provided with a cylindrical end 326 for housing a bushing assembly 328. The pivot portion 324 is located inward from the wheel mounting portion 320 and forms an inner leg of the suspension arm. A resilient member 318 is fixed to the outer vertical wall of the suspension arm body and has a pivot portion 331 near the front end thereof. At the front end of the resilient member, there is provided a cylindrical portion 332 for housing a bushing assembly 334. The cylindrical portion 332 is in aligned with the longitudinal axis of the cylindrical end 326 of the suspension arm body 316. The pivot portions 324 and 331 slope upwards towards the pivotal axis thereof.

The cylindrical end 326 and the cylindrical portion 332 pivot about pivot bolts passing through the bushing assemblies 328 and 334 and engaging the inner and outer brackets fixed to the rear vertical surface of the suspension member. Therefore, the axes of the pivot bolts are aligned to form a common pivot axis 337 for substantially vertical swing movement of the suspension arm 312 with respect to the suspension member.

On the other hand, the rear portion of the suspension arm 312 is suspended from the vehicle body (not shown) via a shock absorber assembly 344 including a shock absorber 346 and a suspension coil spring 348. The lower end of the shock absorber 346 is connected to the suspension arm 312 via a bracket 350 and the top thereof is connected to the vehicle body via a vibration damper 352. The suspension coil spring 348 winds around the upper portion of the shock absorber between upper and lower spring seats 354. In this construction, the shock absorber assembly 344 is adapted to absorb most of the vertical shock and to resiliently suspend the suspension arm 312 from the vehicle body.

Figure 21:
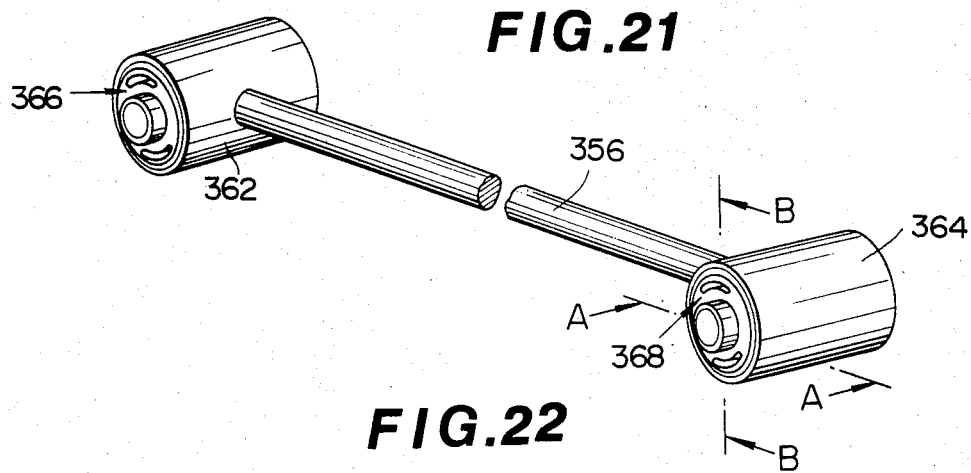
FIG. 21 is an enlarged perspective view of the lateral rod in the semi-trailing arm suspension of FIG. 20.
Figure 22:
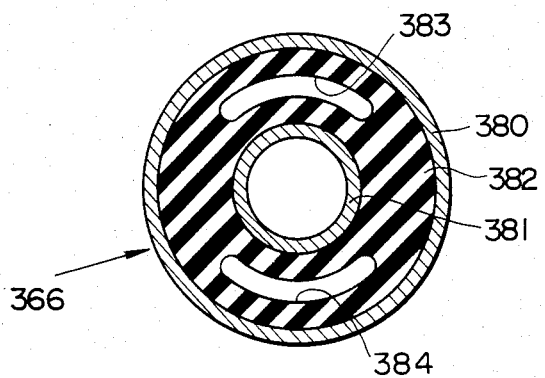
FIG. 22 is a sectional view taken along line A—A of FIG. 21.
Figure 23:
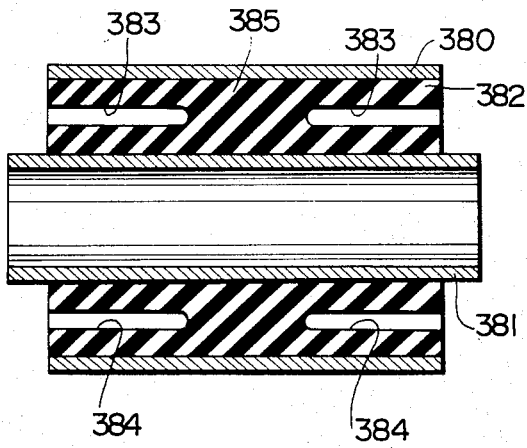
FIG. 23 is a sectional view taken along line B—B of FIG. 21.

A lateral rod 356 has outer and inner ends 358 and 360 respectively provided with cylindrical portions 362 and 364 which house bushing assemblies 366 and 368. The outer end 358 with the bushing assembly 362 engages an axle 370 extending from the rear end of the suspension arm 312 near the spindle 372, which rotatably supports a wheel 374 and a wheel hub 376. The inner end 360 of the lateral rod 356 is connected to the vehicle body via a bracket 378. As shown in FIGS. 21 to 23, the lateral rod 356 is inclined frontwardly and upwardly towards the bracket 378.

With the construction as set forth, the bushing assemblies 366 and 368 are respectively constructed as shown in FIGS. 22 and 23. Each of the bushing assemblies 366 and 368 comprises an outer cylinder 380, an inner cylinder 381 and an annular rubber bushing 382. The rubber bushing 382 is formed with arcuate grooves 383 and 384 which are diametrically opposed along the longitudinal axis of the lateral rod 356. As apparent from FIG. 23, the grooves 383 and 384 extend only part of the way through the axial interior 385 of the bushing 382.

In this bushing assembly construction, the bushing assemblies 366 and 368 exhibit differential rigidity radially. Specifically, the bushing assemblies 366 and 368 are easily deformed along the longitudinal axis of the lateral rod 356 until the grooves 383 and 384 are completely closed. Therefore, the lateral rod 356 will not interfere so significantly when the suspension arm 312 moves up and down in response to vertical road shocks on the wheels. This reduces stress on the bushing assemblies 366 and 368 caused by distortion of wheel alignment in response to lateral forces in order to expand the lifetime of the rubber bushings 382.

Therefore, even if the rigidity of the rubber bushing 382 is relatively high, this will not influence absorption of road shock. In other word, rather rigid bushings can be used in the bushing assemblies 366 and 368 to increase driving stability.

Figure 24:
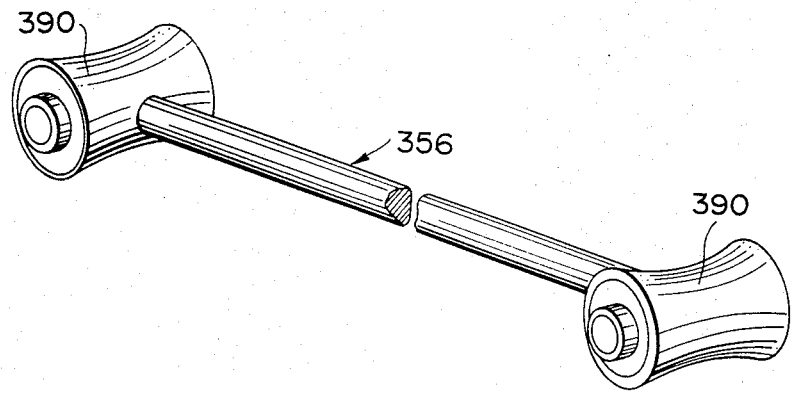
FIG. 24 is a perspective view of a modification of the lateral rod of FIG. 21.
Figure 25:
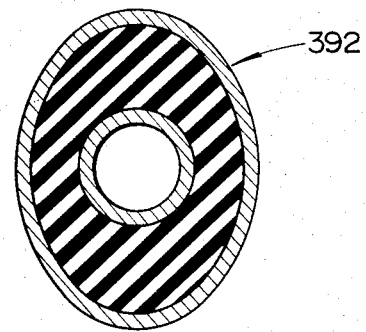
FIG. 25 is a cross-sectional view of a bushing assembly of another modification of the lateral rod construction of FIG. 21.

The same effect can be achieved with various bushing assembly structures. For example, the radial position of the grooves can be shifted to the axis normal to the longitudinal axis of the lateral rod 356. In addition, as shown in FIGS. 24 and 25, the equivalent effect can be achieved by adjusting the shape of the bushing assembly. In the example of FIG. 24, the bushing assembly 390 has a truncated hourglass configuration. On the other hand, in the example of FIG. 25, the bushing assembly 392 is formed with an oval cross-section. The elongated axis of the oval cross-section of the bushing 392 is aligned vertically. With these structures, the bushing assemblies will not influence absorption of vertical shocks. In turn, the lateral rod 356 satisfactorily and effectively restricts the movement of the suspension arm 312 about its motion center to cause toe-in or to reduce toe-out.

Figure 26:
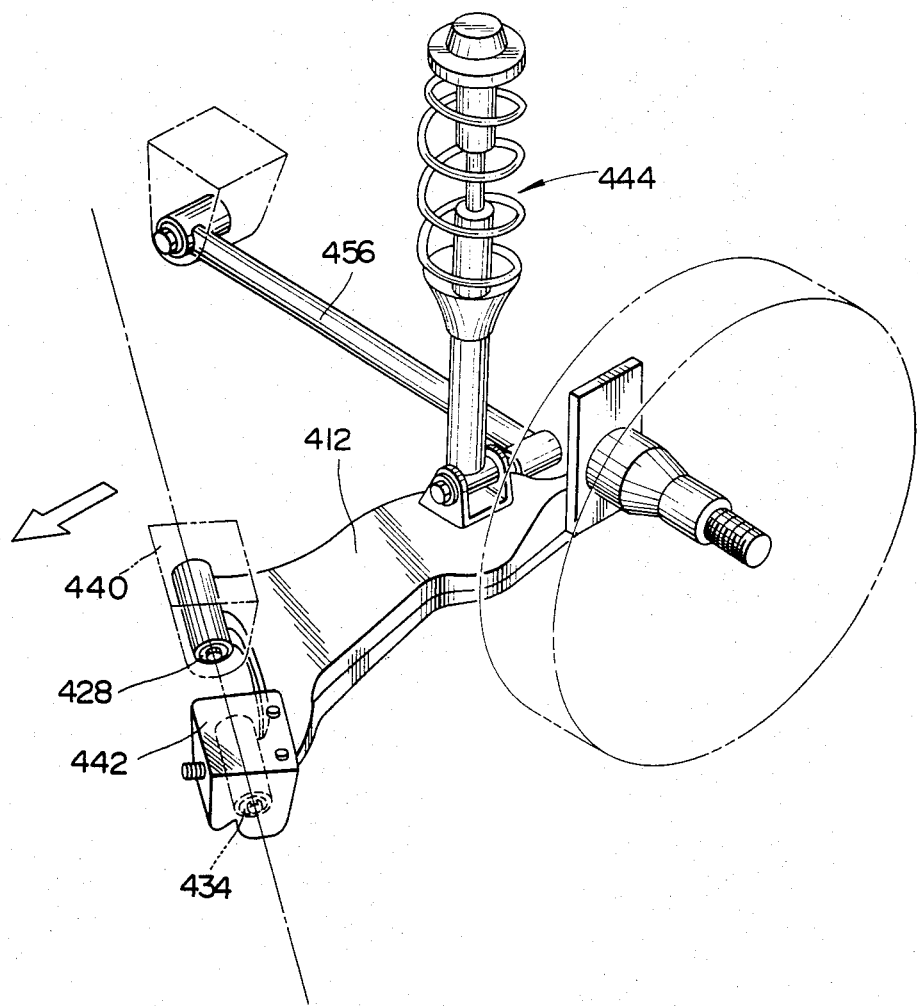
FIG. 26 is a perspective view of the fourth embodiment of the semi-trailing arm suspension of the invention.
Figure 27:
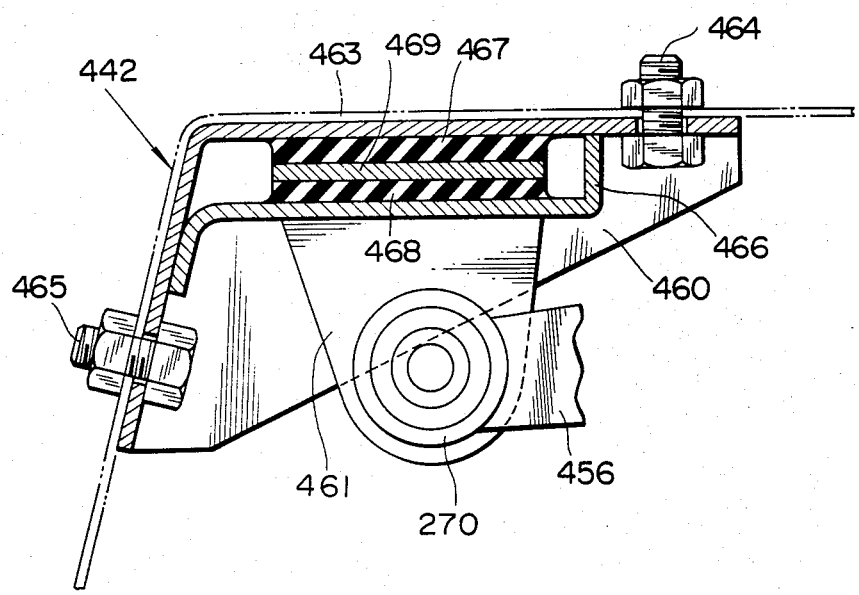
FIG. 27 is a cross-sectional view of a bracket in the suspension of FIG. 26 for mounting the suspension arm to the suspension member.
Figure 28:
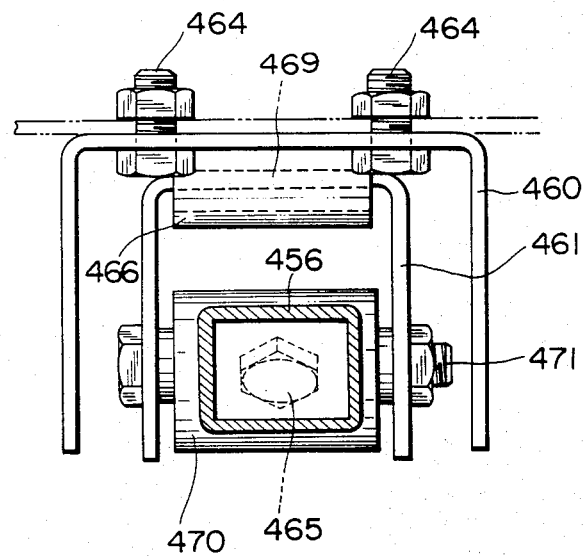
FIG. 28 is a rear elevation view of the bracket of FIG. 27.

FIGS. 26 to 28 show the fourth embodiment of the semi-trailing arm suspension. As in the foregoing embodiments, the suspension arm 412 is hinged to the suspension member (not shown) via the inner and outer brackets 440 and 442. The shock absorber assembly 444 is interposed between the suspension arm 412 and the vehicle body (not shown) to resiliently suspend the suspension arm from the vehicle body. The lateral rod 456 is inserted between the vehicle body and the suspension arm 412 substantially laterally with respect to the plane of motion of the suspension arm. The construction of the present semi-trailing suspension is similar to the foregoing embodiment of FIG. 17.

In the shown embodiment, the bracket 442 includes another absorber bushing therein. As shown in FIGS. 27 and 28, the bracket 442 comprises an outer bracket 460 and an inner bracket 461. The outer bracket 460 is fixedly secured to the vehicle body 463 with fastening bolts 464 and nuts 465. To the lower surface of the outer bracket 460, a crank-shaped member 466 is secured. Between the lower surface of the outer bracket 460 and the upper surface of the crank shaped member 466, rubber plates 467 and 468 are inserted. The rubber plates 467 and 468 sandwich a section 469 of the inner bracket 461 therebetween to resiliently suspend the inner bracket 461 from the outer bracket 460. The inner end 470 of the lateral rod 456 is engaged to the inner bracket 451 via the pivot bolt 471.

In the preferred construction, the rubber plates 467 and 468 are provided with differential rigidity so that the rigidity in the pitch direction of the vehicle is lower than that in other directions. This way, pitch moment damping can be effectively done in cooperation with the bushings 428 and 434 of the suspension arm.

Therefore, as described hereabove, the present invention can fulfill all of the objects and advantages sought thereto.

It should be noted, however, the present invention should not be limited to the foregoing embodiments specifically illustrated. For example, the inclination of the lateral rod can be varied any way as long as it serves to restrict toe-out during compliance steering or roll steering. Also, the specific constructions in each part of the foregoing embodiments can be modified and/or embodied otherwise without departing from the principle of the invention. Furthermore, however all the embodiment shown herebove have been directed to semi-trailing-arm-type suspension, this can also be applied for any swing arm suspension, particularly for a full-trailing arm type suspension.

What is claimed is:

1. A swing arm suspension for an automotive vehicle comprising:
   a vehicle body;
   a suspension arm having a rear portion rotatably supporting a wheel and a front portion pivotably connected to said vehicle body for vertical pivoting movement with respect to a pivot axis between said vehicle body and said suspension arm, said pivot axis crossing a longitudinal axis of the vehicle; and
   a rod member having an outer end connected to said rear portion of said suspension arm and an inner end connected to said vehicle body at a point offset from said pivot axis and above the level of said outer end so that said rod moves the wheel on said suspension arm to a toe-in and negative camber position in response to cornering forces.

2. A trailing arm suspension for an automotive vehicle comprising:
   a vehicle body;
   a suspension arm having a rear portion rotatably supporting a wheel and a front portion pivotably connected to said vehicle body for vertical pivoting movement with respect to a pivot axis between said vehicle body and said suspension arm that is substantially transverse to a longitudinal axis of the vehicle; and
   a rod member having an outer end connected to said rear portion of said suspension arm and an inner end connected to said vehicle body at a position offset from said pivot axis and above the level of said outer end.

3. A semi-trailing arm suspension for an automotive vehicle comprising:
   a vehicle body;
   a suspension arm having a rear portion rotatably supporting a wheel and having pivot portions on a front portion of said suspension arm pivotably connected to said vehicle body for vertical swing movement of said suspension arm with respect to said vehicle body about a common pivot axis of said pivot portions, said pivot axis crossing a longitudinal axis of the vehicle; and
   a rod member connected to said rear portion of said suspension arm at an outer end thereof and extending inwardly therefrom toward said pivot axis of said suspension arm, said rod member being connected to said vehicle body at a position offset from said pivot axis and above the level of said outer end.

4. A semi-trailing swing arm suspension for an automotive vehicle comprising:
   a vehicle body;
   a suspension arm having a spindle on a rear portion thereof for rotatably supporting a wheel and pivot portions on a front portion of said suspension arm, said pivot portions pivotably connected to said vehicle body along a common pivot axis to permit substantially vertical swing movement of said suspension arm about the common pivot axis thereof, said pivot axis crossing a longitudinal axis of the vehicle; and
   a rod member connected to said rear portion of said suspension arm at an outer, forward end thereof and to said vehicle body at an inner rear end thereof in a position offset from said pivot axis and above the level of said outer end.

5. The suspension as set forth in any one of claims 1 to 4, wherein said inner end of said rod member is connected to said vehicle body via a bracket having means for adjusting the location of said second end of said rod member with respect to said first end thereof.

6. The suspension as set forth in claim 5, wherein said adjusting means has elongated openings formed in said bracket for permitting the latter to move along the longitudinal axis of said rod member.

7. The suspension as set forth in claim 6, wherein said adjusting means also has an adjusting screw integral to the rod member which is separated into outer and inner sections, said adjusting screw adjusting the distance between the opposing ends of said outer and inner sections to thereby adjust the overall length of said rod member.

8. The suspension as set forth in claim 5, wherein said pivot portions of said suspension arm connected to said vehicle body via a bracket having means for adjusting the inclination of said suspension arm with respect to the horizontal plane.

9. The suspension as set forth in claim 8, wherein said inclination adjusting means has a pair of elongated curved openings formed in said bracket, which elongated curved openings are engageable with a pivot axle for pivoting said front end of said suspension arm relative to said vehicle body and guide the vertical adjusting movement of said pivot axle therealong.

10. The suspension as set forth in claim 5, wherein said pivot portions of the suspension arm are connected to said vehicle body via a brushing assembly which includes means for providing anisotropic rigidity in order to provide sufficient flexibility in relation to vertical forces applied to the vehicle and sufficient rigidity for lateral forces.

11. The suspension as set forth in claim 10, wherein said anisotropic rigidity providing means has grooves formed in said bushing assembly along the longitudinal axis of the suspension arm, said grooves diametrically opposing one another.

12. The suspension as set forth in claim 10, wherein said bushing assembly has different rigidity at the outer and inner sections thereof such that it has a tendency to cause change in the wheel alignment in the toe-in direction.

* * * * *

UNITED STATES PATENT AND TRADEMARK OFFICE
CERTIFICATE OF CORRECTION

PATENT NO. : 4,537,420

DATED : August 27, 1985

INVENTOR(S) : Hideo Ito et al

It is certified that error appears in the above-identified patent and that said Letters Patent is hereby corrected as shown below:

On the title page, in the Foreign Application Priority Data, cancel the designation "[U]" following application No. "57-25500".

Signed and Sealed this

Thirteenth Day of May 1986

[SEAL]

Attest:

DONALD J. QUIGG

Attesting Officer

Commissioner of Patents and Trademarks